United States Patent [19]

McCloskey et al.

[11] 4,080,233

[45] Mar. 21, 1978

[54] METHOD OF MAKING A SELF-LUBRICATING BEARING

[75] Inventors: Albert R. McCloskey, Fairfield; Gordon T. Williams, Newtown, both of Conn.

[73] Assignee: The Heim Universal Corporation, Fairfield, Conn.

[21] Appl. No.: 681,476

[22] Filed: Apr. 29, 1976

Related U.S. Application Data

[63] Continuation of Ser. No. 531,521, Dec. 11, 1974, abandoned.

[51] Int. Cl.² .................. B29D 3/02; B29C 25/00; B29G 5/00
[52] U.S. Cl. .................. 156/212; 156/242; 252/12.2; 252/12.4; 264/137; 264/255; 264/259; 264/296; 264/309; 308/238; 308/DIG. 8; 427/201; 428/244; 428/327
[58] Field of Search .............. 252/12, 12.2, 12.4, 252/12.6, 13; 308/238, 240, DIG. 8, DIG. 9; 264/112, 309, 255, 294, 295, 259, 137; 156/242, 245, 212

[56] References Cited

U.S. PATENT DOCUMENTS

| 3,455,864 | 7/1969 | Dodson | 252/12 |
|---|---|---|---|
| 3,582,166 | 6/1971 | Reising | 308/238 |
| 3,594,049 | 7/1971 | Turner | 308/72 |
| 3,674,689 | 7/1972 | Giltron et al. | 252/12.4 |
| 3,741,855 | 6/1973 | Harrison et al. | 308/238 |
| 3,781,205 | 12/1973 | Cairns et al. | 252/12 |
| 3,821,013 | 6/1974 | Daley et al. | 264/29.2 |
| 3,950,047 | 4/1976 | Capelli | 252/12 |
| 3,969,232 | 7/1976 | Turner | 252/12.4 |

*Primary Examiner*—Willard E. Hoag
*Attorney, Agent, or Firm*—James C. Wray

[57] ABSTRACT

Method of making a spherical bearing includes a bearing liner having a low-friction layer containing a resin matrix which includes therein a dispersion of self-lubricating particles. The particles include powdered or flock polytetrafluoroethylene particles and grahite fibers.

2 Claims, 5 Drawing Figures

METHOD OF MAKING A SELF-LUBRICATING BEARING

This is a continuation of application Ser. No. 531,521, filed Dec. 11, 1974, and now abandoned.

BACKGROUND OF THE INVENTION

1. Field of the Invention

This invention relates to a bearing having a self-lubricating liner and, more specifically, a liner containing a resin matrix including therein a dispersion of fluorocarbon particles having a low coefficient of sliding friction and graphite fibers.

2. Description of the Prior Art

Although, traditionally, bearings have been lubricated by liquid lubricants such as oil, it has been felt that attendant problems with the use of liquid could be avoided through the use of dry lubricants in the form of a bearing liner. Some noteworthy efforts to provide a bearing have a self-lubricating liner include, for example, those disclosed in U.S. Pat. Nos. 2,988,397; 3,198,691, 3,471,207; and 3,549,049. These disclosures teach the use of a liner containing an adhesive resin matrix which includes therein a random dispersion of self-lubricating fluorocarbon particles. These particles are intended to provide the low coefficient of sliding friction essential for a bearing surface while the resin provides a means of supporting the particles and insuring their adherence to the bearing member.

Although they have the desired low coefficient of sliding friction, there are other properties of the fluorocarbon particles which limit their broader application as a bearing liner material. The self-lubricating fluorocarbon material most often used, for example, is Teflon (a trademark of the DuPont Corporation for polytetrafluoroethylene) which has demonstrated a tendency to deform or extrude when subjected to higher load conditions at temperatures around 325° F. As a result, when utilized during these operating conditions, there is increased wear of the bearing liner and a corresponding decrease in its effective life. This general problem is further aggravated by the fact that the fluorocarbon material also has a relatively low thermal conductivity which interferes with the desired dissipation of frictional heat under these more critical operating conditions. Although the resin matrix does allow some beneficial heat transfer and does make some contribution to the overall strength of the liner, it is not primarily chosen for its heat transfer or strength capabilities but rather for its ability to support the particles without disturbing the low coefficient of sliding friction provided by the particles and essential in a self-lubricating bearing.

It has generally been recognized that the use of graphite in the resin matrix might be desirable since it too is a self-lubricating material and has heat transfer characteristics and resistance to wear which are better than those of fluorocarbon. A number of attempts have heretofore been made to introduce graphite in the form of powder or flakes within the matrix to improve the wear properties of the liner. Examples include some of the above-cited patents and U.S. Pat. No. 3,238,601. However, since graphite has a higher and, therefore, less desirable coefficient of sliding friction than fluorocarbon, the amount of graphite powder utilized has been limited with respect to the amount of fluorocarbon particles utilized in an effort to optimize the desirable properties of each. The overall improvement in strength and wear resistance at normal operating temperatures and loads of a bearing liner including the graphite powder has accordingly been limited by this balance. These improvements in the liner for normal operating conditions are not as significant if the liner is operated at the same higher temperatures and under the same heavier work loads that would result in its failure, as discussed above, if no graphite were present.

As a result, although generally recognizing the strength and wear limitations of these self-lubricating liners at higher operating temperatures and load conditions, the above-cited patents do not particularly address themselves to a means of effectively improving the bearing liner for use throughout the wider range of desired operating conditions.

SUMMARY OF THE INVENTION

It is therefore an object of the invention to provide a bearing which includes a self-lubricating, low friction surface which remains effective at relatively high operating temperatures and load conditions.

It is a further object of the invention to provide a bearing of the type described wherein the bearing liner has a surface layer which contains a resin matrix including therein a random dispersion of self-lubricating particles to provide the low-friction surface.

It is another object to provide a liner of the type described wherein some of the particles are fluorocarbon having a relatively low coefficient of sliding friction and others are graphite fibers.

It is still another object to provide a method of producing a bearing of the type described.

These and other objects of the invention are achieved in a preferred embodiment thereof in the form of an improved bearing liner having a low-friction layer. The layer is of a type which contains a resin matrix including therein a random dispersion of self-lubricated particles. The particles are a mixture of fluorocarbon and graphite fibers thereby combining the positive value characteristics of each particle form. A mixture by weight of 53½ parts of fluorocarbon, 1½ parts of graphite fiber, and 45 parts of resin has been utilized to provide the desired low-friction layer of the invention.

DETAILED DESCRIPTION OF THE PREFERRED EMBODIMENT

Figure 1:
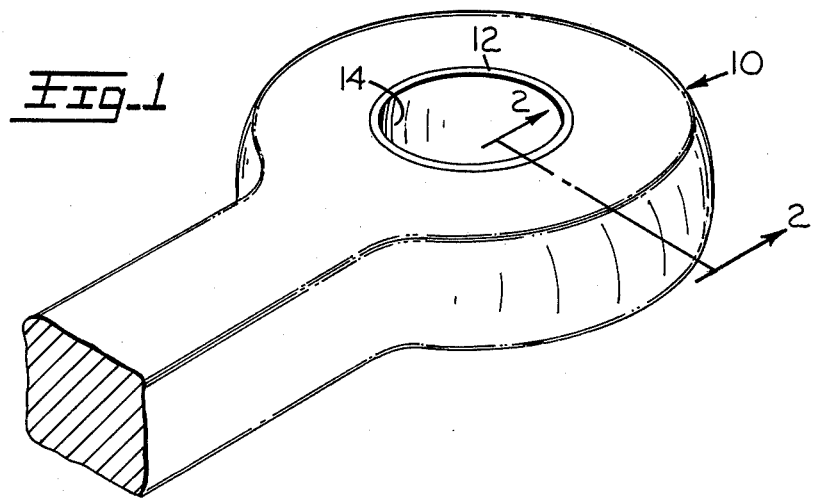
FIG. 1 is a fragmentary perspective view of the spherical bearing embodying the bearing liner of the present invention.

As shown in FIG. 1, the preferred spherical bearing member 10 is capable of receiving a mating member (not shown) and provides omnidirectional sliding contact therebetween by the use of a bearing liner 12 having a self-lubricating bearing surface 14.

Figure 2:
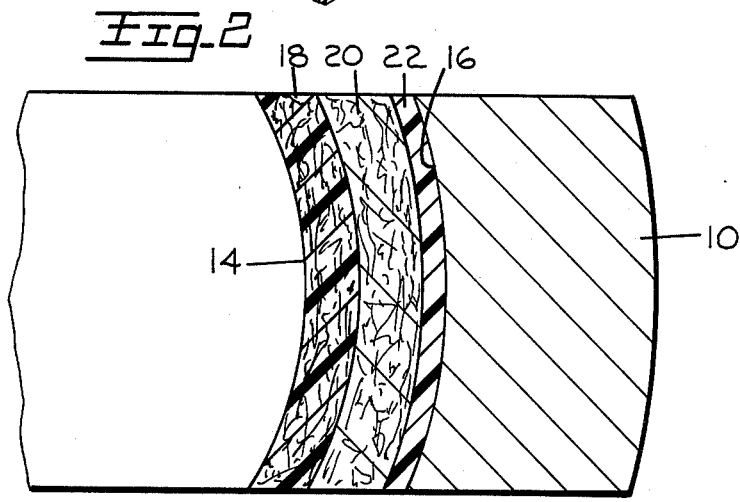
FIG. 2 is a sectional view taken along line 2—2 of FIG. 1.

The preferred liner 12 may be fixedly applied to the interior surface 16 of the member 10, as seen in FIG. 2. The liner 12 includes an outer, low-friction layer 18 to provide the bearing surface 14; a backing material 20; and an adhesion layer 22 adjacent the interior surface 16 of the member 10. Although the preferred method of forming liner 12 will be discussed in detail hereinbelow, it is perhaps best to first examine the layer 18 to determine the essential features of the liner 12 which enable it to satisfy the above stated objects of the invention.

Figure 4:
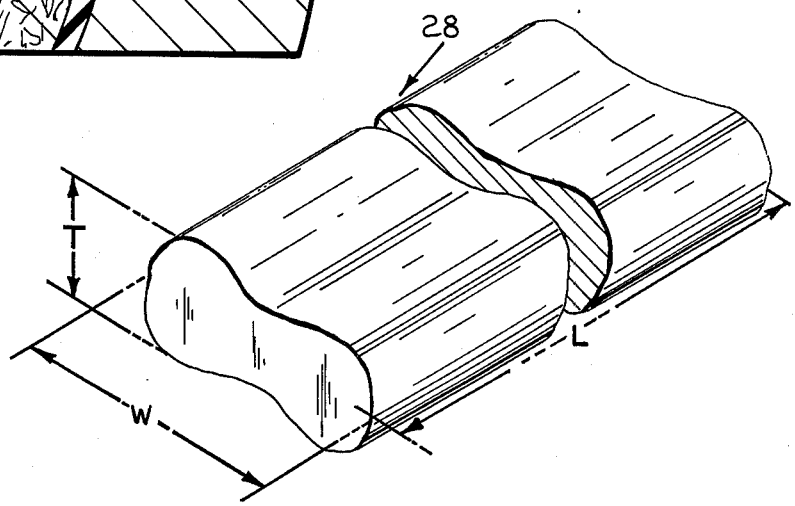
FIG. 4 is an enlarged perspective view of one preferred form of graphite fiber utilized in the invention.

The layer 18 basically includes a resin matrix 24 with fluorocarbon particles 26 and graphite fibers 28 randomly disposed therein to make a combined contribution to the mechanical properties of the liner 12 and of the surface 14. Specifically, the preferred fluorocarbon particles 26 are Teflon and the preferred graphite fibers 28 are, as shown in FIG. 4, high modulus, non-circular fibers such as those sold by Great Lakes Carbon Corporation under the trademark FORTAFIL. As indicated above, and in the above-cited prior art disclosures, the Teflon particles 26 basically provide a liner with the characteristic low-friction surface essential to the operation of a self-lubricating bearing at normal operating temperature and load conditions. However, in accordance with the present invention, it is at the higher operating temperatures and loads that the effectiveness of these prior art devices is limited. Therefore, the discussion hereinbelow will be primarily directed at the contribution the graphite fibers 28 make to alter the mechanical properties of the bearing liner 12 and the surface 14.

As seen in FIG. 4, a typical fiber 28, preferably a non-circular FORTAFIL fiber, has a length L, a width W, and a thickness T. The length L may be approximately ⅛ inch, the width W may vary from about 12.5 to about 14.0 microns, and the thickness T may be in the range of 4.5 microns to about 5.5 microns. One form of FORTAFIL fibers utilized in the testing program involving the invention had a Young's Modulus of about $48 \times 10^6$ psi. Other fiber types with a Young's Modulus between $30 \times 10^6$ and $60 \times 10^6$ psi could also be employed. Although graphite is a self-lubricating material, it has been estimated that the coefficient of sliding friction of a graphite fiber is about three times as great as the coefficient of sliding friction of Teflon. However, the tensile strength and the thermal conductivity of the graphite are substantially greater than that of Teflon. In the present invention, the introduction of graphite to the matrix in the form of fibers, rather than the powder previously utilized, allows the graphite to make a more substantial contribution to the overall strength and wear resistance of the liner 12 while the relatively low coefficient of sliding friction of the surface 14 is characteristically established by the Teflon particles.

Figure 3A:
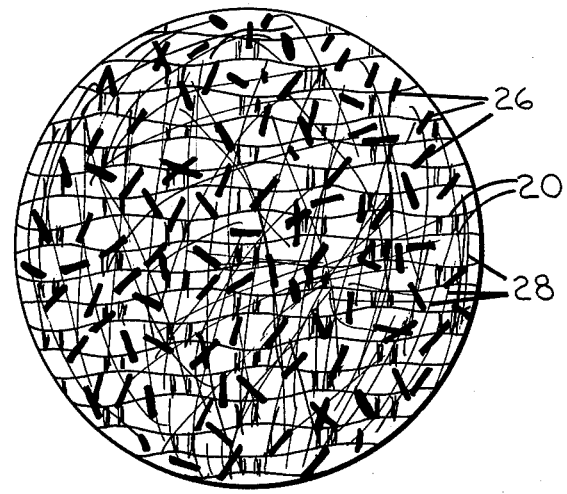
FIG. 3a is an enlarged view of a portion of the surface of the bearing liner of FIG. 2 with the resin matrix being represented as entirely transparent in an effort to demonstrate various features of the invention.

This is accomplished in the invention by a random dispersion of both the Teflon particles 26 and the graphite fibers 28 in the resin matrix. Although it is not necessary for a full understanding of the invention, FIG. 3a is provided as a general illustration of the bearing liner which shows the overall form and content of the random dispersion that exists throughout the layer 18. For the purpose of this illustration, the resin matrix is treated as though it were transparent when it is typically relatively opaque. FIG. 3a, therefore, includes the preferred woven backing material 20 which would not normally be seen when examining the surface 14. To obtain a general feel for the relative dimension involved, it should be stated that width of the liner section shown in FIG. 3a is about 1/6 of an inch. The graphite fibers 28 randomly lie within the layer 18 with some tendency to collect in the depressed regions of the backing material 20, a general stacking of the fibers 28 is possible with no portion of those closest to the backing material 20 extending to the surface 14. The fluorocarbon particles 26 shown in FIG. 3a are Teflon flock which has been darkened by etching.

Figure 3B:
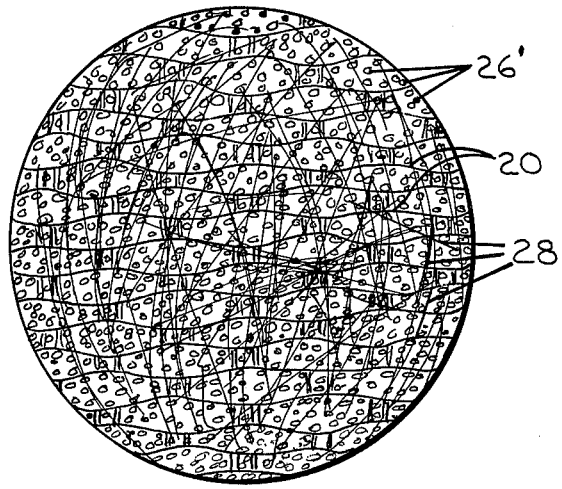
FIG. 3b is a view like that of FIG. 3a but including an alternative type of fluorocarbon particles.

FIG. 3b is a view of an improved layer like that shown in FIG. 3a but including therein alternative fluorocarbon particles 26' which are in the form of a white Teflon powder and are relatively smaller than shown in the illustration.

In the preferred liner 12, the Teflon particles 26 are randomly distributed throughout the layer 18 but are beneficially located at the surface 14 to provide the low coefficient of sliding friction. The graphite fibers 28 are intermixed throughout the layer 18 but are beneficially located with only minimal exposure at the surface 14 to transfer heat from the surface 14 and to add strength to the entire layer 18 without being the major contributor to the coefficient of sliding friction of the surface 14. It can be seen that the fibers 28, which are elongated and relatively thin with respect to the thickness of the layer 18 are capable of extending from the surface 14 to within the layer 18 with only a small amount of surface area actually being located at the surface 14.

The preferred method of forming the bearing 10 is an improvement of a method generally disclosed in U.S. Pat. No. 3,471,207, and directed toward the use of fluorocarbon particles alone.

The preferred self-lubricating particles are graphite fibers of the type described hereinabove and Teflon particles with the graphite fibers being from about 2% to about 20% of the total particles by weight. The Teflon particles are preferably Teflon flacking comprising strands of polytetrafluoroethylene fiber, typically about 1/64 of an inch long and having a diameter greater than the width W of the graphite fiber 28. The Teflon flocking may be chemically etched to render the particles more bondable. Such etching of Teflon is well known in the art and described, for example, in U.S. Pat. Nos. 2,789,063 and 2,809,130. The Teflon particles may also include Teflon in a powdered form mixed with the Teflon flocking or as an alternative thereto. Teflon powder may be purchased, or prepared by rolling commercial sheet polytetrafluoroethylene and abrading the material with a file while it is rotating at a high rate of speed in a lathe. The resulting particles which form the Teflon powder are substantially smaller than those of the Teflon flocking.

A mixture of about equal amounts by weight of the self-lubricating particles and of a resin such as Resiweld R-7119 phenolic base resin manufactured by H. B. Fuller Company, St. Paul, Mo. is preferred. Excellent results were obtained during the testing program with a self-lubricating particle-phenolic resin mixture which included by weight 45% resin, 1½% graphite fiber, and 53½% Teflon particles.

The self-lubricating particle-phenolic resin mixture is deposited, as at 18 of FIG. 2, by painting, spraying or the like on a backing material, such as that indicated at 20. The backing material 20 may comprise, for example, a woven fabric, as shown in FIGS. 3a and 3b, having threads of Dacron (a trademark of the DuPont Corporation for a polyester staple length fiber), fiberglass, aluminum foil, or the like. The resin composition is allowed to stand on the backing material until set, typically about one day.

The composite liner is then placed between flat platens of a high pressure press. The press platens, heated for the above-specified Resiweld adhesive to a temperature in the range of 350° to 400° F. (preferably about 375° F), exert a pressure in the range of 400–1000 pounds per square inch (advantageously about 600 psi). The foregoing conditions are maintained for about one-half hour except for a short reduction in the applied pressure for gas relief.

The foregoing operation causes the Resiweld resin to cure, i.e., to irreversibly harden by polymerizing, thereby locking the graphite fibers 28 and the Teflon particles 26 in place affixed to the backing material 20. After the curing cycle, the calendered liner is removed from the press, and is flexible in the sense that it may be readily bent into tubular form.

Another layer of uncured resin is next applied to the liner material, and more particularly to the backing material, as at 22, to form the adhesive layer. The second coat of resin is allowed to set, e.g., to harden for about one day. The resin is preferably the same phenolicbase resin used previously, although other adhesives may be employed, including those which can be purchased in film form.

The bearing liner 12, including the still uncured resin at 22, is then formed to closely contact the interior surface 16 of the bearing member 10 in a manner well known in the art, such as that disclosed in U.S. Pat. No. 3,471,207. The bearing is then placed in an oven where it is heated to a temperature somewhat less than that employed in the first curing cycle, i.e., to about 350° F. for the abovementioned Resiweld adhesive. This somewhat lower temperature is sufficient to cure the second coat of resin and bond the composite liner 12 to the interior surface 16 of the bearing member 10. Moreover, since the temperature is lower than that which was obtained during the first curing operation, the lubricating surface 14 of the linear 12 facing the mating member does not soften during this latter heating process to result in any undesired adhesion therebetween. The bearing 10, finished in this manner, includes the liner 12 with an improved low-friction layer 18 to satisfy the objectives of the invention.

While there has been shown a preferred bearing, bearing liner and method of making the same, it should be obvious to those skilled in the art that changes and modifications may be made therein without departing from the claimed invention. For example, the lining and method may be employed to produce other types of bearing than a spherical bearing.

What is claimed is:

1. A method of making a bearing having a low-friction bearing surface, which comprises:

mixing fluorocarbon particles and graphite fibers at a ratio by weight of at least five to one and not greater than fifty to one with about an equal amount by weight of an adhesive thermosetting resin to be randomly dispersed therein, said graphite fibers being high modulus fibers with a non-circular cross-section to have a maximum width of about 14.0 microns and a length substantially greater than said maximum width, applying said mixture of particles, loose fibers, and resin to a backing material in a layer thereon to cause said fibers and particles to lie in a general random dispersion arrangement therein, applying heat to cause said mixture to cure while it is on said backing material to form a flexible sheeting having a low-friction bearing surface, forming said sheet into a bearing liner against the structure of said bearing, said backing material nearest the structure and with said surface facing outwardly of said backing material away from said structure, and securing said liner to said structure to provide said bearing.

2. A method as set forth in claim 1, wherein said mixing includes by weight about 53½ part of polytetrafluoroethylene particles, 1½ parts of graphite fibers and 45 parts of resin.

* * * * *